United States Patent [19]
Shiratsuchi et al.

[11] Patent Number: 5,856,379
[45] Date of Patent: Jan. 5, 1999

[54] AQUEOUS DISPERSION OF CORE/SHELL-TYPE COMPOSITE PARTICLES WITH COLLOIDAL SILICA AS THE CORES AND WITH ORGANIC POLYMER AS THE SHELLS AND PRODUCTION METHOD THEREOF

[75] Inventors: Kentaro Shiratsuchi; Hirohisa Hokazono, both of Kanagawa, Japan

[73] Assignee: Fuji Photo Film Co., Ltd., Minami-ashigara, Japan

[21] Appl. No.: 779,647

[22] Filed: Jan. 15, 1997

[51] Int. Cl.$^6$ .................................................. C08K 9/00
[52] U.S. Cl. ........................... 523/209; 523/210; 523/212; 523/216; 428/403; 428/404; 428/405; 428/407
[58] Field of Search ...................................... 523/209, 210, 523/212, 216; 428/403, 404, 405, 407

[56] References Cited

U.S. PATENT DOCUMENTS 5,218,014  6/1993  Matsumoto et al. ..................... 523/209

FOREIGN PATENT DOCUMENTS 1-177033  7/1989  Japan .

*Primary Examiner*—Edward J. Cain
*Attorney, Agent, or Firm*—Burns, Doane, Swecker & Mathis, LLP

[57] ABSTRACT

An aqueous dispersion of core/shell type composite particles having colloidal silica as the cores and having an organic polymer as the shells is disclosed, comprising an aqueous dispersion of particles obtained by carring out a reaction operation of coupling reacting (a) colloidal silica and (b) an organoalkoxysilane in an aqueous medium in the presence of a dispersion stabilizer and thereafter polymerizing the coupling reaction product and (c) a vinyl monomer having at least one ethylenically unsaturated group, and further a method for producing the aqueous dispersion is disclosed.

The aqueous dispersion has a good dispersion stability, by-produces less polymer sole particles, and a high coating degree of a polymer on the surfaces of the silica particles.

5 Claims, 5 Drawing Sheets

AQUEOUS DISPERSION OF CORE/SHELL-TYPE COMPOSITE PARTICLES WITH COLLOIDAL SILICA AS THE CORES AND WITH ORGANIC POLYMER AS THE SHELLS AND PRODUCTION METHOD THEREOF

FILED OF THE INVENTION

The present invention relates to an aqueous dispersion of core/shell-type composite particles having colloidal silica as the cores and having an organic polymer as the shells, and a method for producing the aqueous dispersion.

BACKGROUND OF THE INVENTION

Colloidal silica is widely utilized as a reinforcing agent for elastomers such as sealants, rubbers, etc., as a sedimentation inhibitor in the systems containing fillers or pigments, a thickener or a thixotropic agent of liquid resins, and a blocking inhibitor for films for the purposes of increasing the stiffness, strength and/or the dimensional stability of materials, increasing the toughness and/or the impact resistance of materials, increasing the heat strain temperature of materials, increasing the mechanical decay of materials, decreasing the permeability of materials to gases and liquids, improving the electric properties of materials, reducing the cost of materials, and the like.

When colloidal silica particles are filled in a polymer, the various properties shown by the composite material of the polymer containing the colloidal silica fine particles are decided by the characteristics of the components constituting the composite material, the dispersed state of the colloidal silica fine particles, and the interface characteristics between the colloidal silica fine particles and the matrix. It is known, in the properties described above, the morphology (the dispersed state of colloidal silica fine particles) of the composite film and the interface characteristics are important as the parameters inherent to the composite material and give large influences on the performance of the composite material.

In general, in the case of dispersing inorganic fine particles in a polymer, a method of increasing the affinity of the inorganic fine particles and the polymer matrix by treating the inorganic fine particles with a coupling agent for improving the dispersed state of the inorganic fine particles in the polymer matrix is known but there are many cases that a good dispersibility is not obtained and the physical strength is insufficient in the coupling agent treatment. Accordingly, in place of the method described above, investigations for improving the dispersibility of inorganic fine particles by coating or grafting the inorganic fine particles with a polymer have been carried out.

As the method of coating inorganic fine particles with a polymer, there are generally "a method of using a previously prepared polymer" and "a method of polymerizing a monomer on the surfaces of inorganic fine particles and coating the particles with the formed polymer".

"As the method of using a previously prepared polymer", there are a method of adsorbing or chemically bonding the previously prepared polymer to the inorganic fine particles, a coacervation method, a heteroaggregation method, a dry blend method, and the like but in these methods, there are many restrictions for optionally controlling the coating amount of the polymer on the surfaces of- the inorganic fine particles, and also when the particle sizes of the inorganic fine particles are small, the application of these method is difficult.

On the other hand, "the method of polymerizing a monomer on the surfaces of inorganic fine particles and coating the particles with the formed polymer" is an excellent method in the point capable of carrying out the formation of a polymer and coating of the inorganic fine particles with the polymer formed in one stage and also in the point of imparting functions to the coated particles such as easily introducing polar groups and/or functional groups to the coating polymer. The researches about the surface treatment of inorganic powders by such a polymerization method are described in detail in Kroker et al., *Progr. Org. Coatings,* 1, 23(1972) and Nagai et al, *Kobunsi Kako (High molecular Processing),* Vol. 39, No. 11, 537–542(1990).

Also, as to "the method of polymerizing a monomer on the surfaces of inorganic fine particles and coating the particles with the formed polymer", various methods such as a polymerization method by the active species on the surfaces of inorganic fine particles, a polymerization method by the adsorption or bonding of an initiator, a polymerization method by the adsorption, bonding, or intercalation of a monomer, a polymerization method by the solubilization of a monomer to the surface adsorption layer, a polymerization method by the precipitation and adsorption of-growth groups, and the like are proposed in K. Nollen et al., *Angew. Makromol. Chem.,* 6 1(1069), F. Runge et al., *Makromol. Chem.,* 81, 68(1965), K. Furusawa et al., *J. Colloid Interface Sci.,* 109, 69(1986), M. Hasegawa et al., *J. Polym. Sci., Polym. Chem. Ed.,* 25, 3117 and 3231(1987), etc. However, in the methods described above, there are many problems that the control of the amount of the polymer formed is difficult, a large amount of aggregation is formed, thereby it is difficult to keep the stability of the dispersion, a large amount of homopolymer particles is separately formed, the monomer species which can be applied are restricted and thus, the methods are poor in general uses, and also reaction process of many stages is required, whereby the methods are poor in the practical use.

Furthermore, a method wherein a polymerization functional group (vinyl group) is introduced by the chemical modification of the hydroxyl group on the surfaces of silica fine particles and by the copolymerization of the inorganic fine particles having the vinyl group at the surfaces of the particles and a vinyl monomer, a polymer is grafted to the surface of the particles is disclosed in M. Chaimberg et al., *J. Appl. Polym. Sci.,* 37, 2921(1989). This method has a definite effect for obtaining the composite particles of a water-soluble polymer and silica but in the method, there are problems that the graft efficiency is very low and a large amount of polymers which are not bonded to the particles are by-produced.

Also, E. Bourgeat-Lami et al reported the result of carrying out an emulsion polymerization while adding dropwise ethyl acrylate and dodecyl sodium sulfate using silica particles modified by hydroxyethyl methacrylate as cores in the presence of a nonionic surface active agent in ACS Symposium Series 585 (1995), "*Hybrid Organic-Inorganic Composites*", Chapter 10 but in this case, although the synthesized composite particles are partially grafted to the silica particles, the particle form obtained is an aggregate form and uniform polymer coating is not performed while keeping the dispersibility. E. Bourgeat-Lami et al. stated that in the case of polymer coating of silica particles in an aqueous system, silica particles were liable to form aggregates and in addition to silica particles, which became the seeds, the polymer sole particles were liable to form, whereby it was very difficult to carry out the formation of uniform composite particles.

Moreover, JP-B-4-48832 (the term "JP-B" as described herein means an "examined published Japanese patent application") discloses an aqueous dispersible composition of the organic-inorganic hybrid type polymer particles obtained by emulsion-polymerizing a (meth)acrylic acid ester monomer, a monomer containing a polymerizable unsaturated double bond and an alkoxysilyl group together in the molecule and colloidal silica in an aqueous medium in the presence of an anionic surface active agent and/or a nonionic surface active agent. However, the production method described in the above patent publication is a method of polymerizing by simultaneously adding the vinyl monomer and the monomer containing the polymerizable unsaturated double bond and the alkoxysilyl group together in the molecule to an unmodified colloidal silica dispersion and as the result of out investigations, it has been clarified that even in the method, coating by the polymer on the surfaces of the colloidal silica particles proceeds only partially and also many polymer sole particles are by-produced.

As described above, by the conventionally known methods, it has been difficult to obtain an aqueous dispersion of core/shell type composite particles having colloidal silica as the cores and having an organic polymer as the shells, which can optionally control the amount of the forming polymer, has a high dispersion stability, does not by-produce polymer sole particles, and has a high uniformity of polymer coating.

SUMMARY OF THE INVENTION

The first object of the present invention is to provide an aqueous dispersion of core/shell type composite particles having colloidal silica as the cores and having an organic polymer as the shells, which has a good dispersion stability, by-produces less polymer sole particles, and has a high coating degree of a polymer on the surfaces of the silica particles and also to provide a production method of the aqueous dispersion.

The second object of the present invention is to provided a fine particle composition in which pressure durability, anti-adhesive property under the condition of a high humidity and film strength, of the silver halide photographic material are improved without deteriorating surface glossiness, haze, graininess and film brittleness.

It has now been discovered that the objects described above can be achieved by the present invention described hereinbelow.

That is, according to the first aspect of the present invention, there is provided an aqueous dispersion of core/shell type composite particles having colloidal silica as the cores and having an organic polymer as the shells, comprising an aqueous dispersion of particles obtained by coupling reacting (a) colloidal silica and (b) an organoalkoxysilane in an aqueous medium in the presence of a dispersion stabilizer, and thereafter, carrying out a reaction operation of polymerizing the coupling reaction product and (c) a vinyl monomer having at least one ethylenically unsaturated group, wherein at least 80% of the particles of said aqueous dispersion of particles are core/shell type composite particles having colloidal silica as the cores and having an organic polymer as the shells.

According a preferred aspect of the present invention, there is provided the aqueous dispersion of the core/shell type composite particles of the first aspect described above, wherein said dispersion stabilizer has a function as an anionic surface active agent and/or a high molecular dispersion stabilizer; the composition ratio of (a) colloidal silica, (b) the organoalkoxysilane, and (c) the vinyl monomer having at least one ethylenically unsaturate group is from 0.1 to 50 parts by weight of (b) and from 3 to 1,000 parts by weight of (c) to 100 parts by weight of (a); the vinyl monomer having at least one ethylenically unsaturated group is a vinyl monomer selected from the group consisting of an acrylic acid ester, a methacrylic acid ester, and an aromatic vinyl compound; the organoalkoxysilane contains a methacryloyl group; and the particle sizes of said core/shell type composite particles are from 0.005 $\mu$m to 1 $\mu$m.

According to the second aspect of the present invention, there is provided a method for producing an aqueous dispersion of core/shell type composite particles, which comprises carrying out a reaction operation of coupling reacting (a) colloidal silica and (b) an organoalkoxysilane in an aqueous medium in the presence of a dispersion stabilizer, and thereafter for obtaining an aqueous dispersion of core/shell type composite particles having colloidal silica as the cores and having an organic polymer as the shells by carrying out a reaction operation of polymerizing the coupling reaction product and (c) a vinyl monomer having at least one ethylenically unsaturated group in the state that said dispersion stabilizer does not substantially form a micell.

According a preferred aspect of the present invention, there is provided the method for producing an aqueous dispersion of the second aspect described above, wherein said dispersion stabilizer has a function as an anionic surface active agent and/or a high molecular dispersion stabilizer.

DETAILED DESCRIPTION OF THE INVENTION

Figure 1:
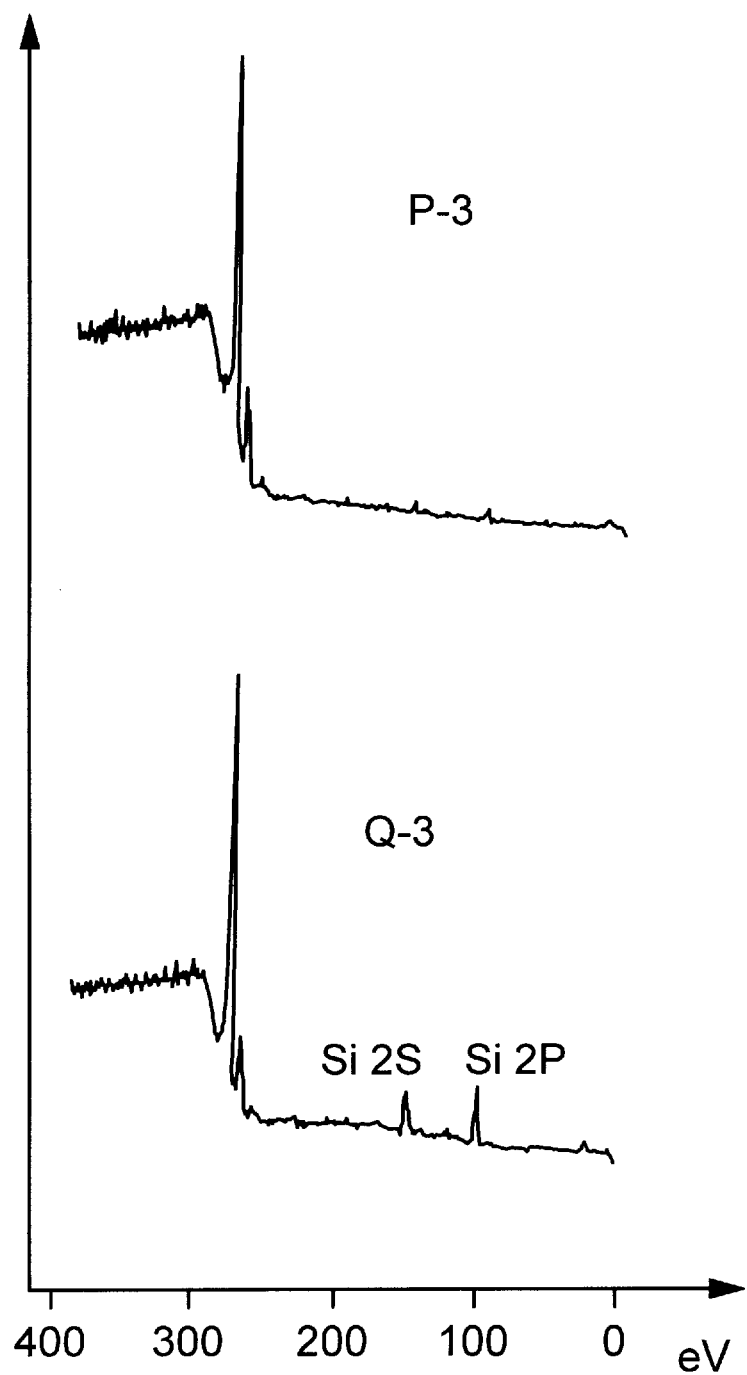
FIG. 1 is a graph showing the results of analyzing the aqueous dispersion of composite fine particles (P-3) of the present invention and a comparative aqueous dispersion of composite fine particles (Q-3) by an X-ray photoelectron spectroscopy (XPS)

Then, the present invention is described in detail.

The colloidal silica which is used for the core portion of the core/shell type composite particles of the present invention means the colloid of the fine particles of silicic acid anhydride having an average particle size of from 5 nm to 1

μm and the descriptions of JP-A-53-112732 (the term "JP-A" as used herein means an "unexamined published Japanese patent application"), JP-B-57-9051, JP-A-57-51653, etc., can be referred to. The colloidal silica can be prepared by a sol-gel method.

In the case of preparing colloidal silica by a sol-gel method, the colloidal silica may be used with a marketed product or synthesized by referring to the methods described in Werner Stober et al., *J. Colloid and Interface Sci.*, 26, 62–69(1968), Ricky D. Badley et al, *Langmuir*, 6, 792–801 (1990), and *Shikizai Kyokai Shi* (*Journal of Color Material Society*). 61[9] 488–493(1088).

Also, in the case of using commercially available products, Snowtex-XL (average particle size of from 40 to 60 nm), Snowtex-YL (average particle size of from 50 to 80 nm), Snowtex-ZL (average particle size of from 70 to 100 nm), PST-2 (average particle size of 21 nm), MP-3020 (average particle size of 328 nm), Snowtex 20 (average particle size of from 10 to 20 nm, $SiO_2/Na_2O>57$), Snowtex 30 (average particle size of from 10 to 20 nm, $SiO_2/Na_2O>57$), Snowtex C (average particle size of from 10 to 20 nm, $SiO_2/Na_2O>100$), Snowtex O (average particle size of from 10 to 20 nm, $SiO_2/Na_2O>100$) [trade names, made by Nissan Chemical Industries, Ltd.] can be preferably used (in this case, $SiO_2/Na_2O$ is the case of showing the weight ratio of the contents of silicon dioxide and sodium hydroxide by converting sodium hydroxide to $Na_2O$, and described in the catalog of the company). In the case of using the commercially available products, Snowtex-YL, Snowtex-ZL, PST-2, MP-3020, and Snowtex C are particularly preferred.

The main component of colloidal silica is silicon dioxide, the colloidal silica may contain alumina or sodium aluminate as a small amount component and further may contain an inorganic base such as sodium hydroxide, potassium hydroxide, lithium hydroxide, ammonia, and the like or an organic base such as tetramethyl ammonium as a stabilizer.

The organoalkoxysilane is an essential component in the present invention having a function of making the surfaces of the colloidal silica particles constituting the cores hydrophobic to provide a polymerization carrying out portion. The surfaces of the colloidal silica particles modified by the organoalkoxysilane have a high polymerization efficiency at the surface of the particles as compared with silica particles unmodified with the organoalkoxysilane, and as compared with the case of using no organoalkoxysilane, the aqueous dispersion of the core/shell type composite particles having less by-production of polymer sole particles and having less residual amount of the shell polymer-uncoated silica particles.

Preferred examples of the organoalkoxysilane include trimethylmethoxysilane, trimethylethoxysilane, dimethyldimethoxysilane, dimethyldiethoxysilane, methyltrimethoxysilane, methyltriethoxysilane, methyldimethoxysilane, methyldiethoxysilane, dimethylethoxysilane, cyclohexylmethyldimethoxysilane, n-hexyltrimethoxysilane, diphenyldimethoxysilane, diphenyldiethoxysilane, phenyltrimethoxysilane, phenyltriethoxysilane, decyltrimethoxysilane, octadecyltrimethoxysilane, octadecyltriethoxysilane, isobutyltrimethoxysilane, β-(3,4-epoxycyclohexyl)ethyltrimethoxysilane, γ-glycidoxypropyltrimethoxysilane, γ-glycidoxypropylmethyldiethoxysilane, γ-aminopropyltriethoxysilane, N-β(aminoethyl)γ-aminopropylmethoxysilane, N-β(aminoetyhyl)γ-aminopropylmethyldimethoxysilane, N-phenyl-γ-aminopropyltrimethoxysilane, γ-mercaptopropyltrimethoxysilane, γ-chloroporpyltrimethoxysilane, vinyltriethoxysilane, vinyltrimethoxysilane, vinyltris(β-methoxyethoxy)silane, dimethylvinylmethoxysilane, dimethylvinylethoxysilane, methylvinyldimethoxysilane, methylvinyldiethoxysilane, vinyltriacetoxysilane, 3-methacryloyloxypropyltrimethoxysilane, and 3-methacryloyloxypropylmethyldimethoxysilane.

Among the above organoalkoxysilanes, n-hexyltrimethoxysilane, decyltrimethoxysilane, octadecyltrimethoxysilane, octadecyltriethoxysilane, isobutyltrimethoxysilane, 3-methacryloyloxypropyltrimethoxysilane, and 3-methacryloyloxypropylmethyldimethoxysilane are particularly preferred.

The surface modification reaction of colloidal silica with the organoalkoxysilane may be carried out at any pH if the reaction is carried out under a condition of not gelling the colloidal silica but for quickly proceeding the hydrolysis and the condensation of the organoakoxysilane, it is desirable that the coupling reaction is carried out at pH of 5 or more, preferably 6.5 or more, and more preferably 7 or more. Also, if necessary, the reaction system may be heated or an auxiliary solvent such as methanol, ethanol, isopropanol, acetone, etc., may be added to the reaction system.

About the surface modification reaction of colloidal silica, the description of Ricky D. Badley et al, *Langmuir*, 6, 792–801(1990) can be referred to.

It is necessary that a dispersion stabilizer exists at the coupling reaction of colloidal silica with the organoalkoxysilane and at the subsequent seed polymerization.

When a dispersion stabilizer is not used at the coupling reaction of colloidal silica, with the progress of the modification of the surfaces of silica particles with the organoalkoxysilane, the surfaces of the silica particles become hydrophobic and the dispersion stability of the colloidal silica in an aqueous medium is lowered, thereby the aqueous dispersion is liable to be aggregated.

The dispersion stabilizer is adsorbed on the modified (hydrophobic property-imparted) surfaces of silica particles and can keep the dispersion stability of the colloidal silica after the coupling reaction. The amount of the dispersion stabilizer necessary for stabilizing the colloidal silica after the coupling reaction differs according to the particle sizes of the colloidal silica particles. That is, in the case of using the colloidal silica particles having small particle sizes, a large amount of the dispersion stabilizer is necessary (since the specific area of the colloidal silica particles is large) and for the colloidal silica particles having large particle sizes, the amount may be small.

The concentration range of the dispersion stabilizer which is preferably used in the present invention is from $1.0 \times 10^{-6}$ g/liter to 20 g/liter (more preferably from from $1.0 \times 10^{-5}$ g/liter to 10 g/liter) as the solution concentration.

On the other hand, since the dispersion stabilizer is generally an organic compound having a surface activity, when the dispersion stabilizer is excessively used, a large number of micells are formed and as the result thereof, a polymerization reaction proceeds not only on the surfaces of the colloidal silica particles modified with the organoalkoxysilane but also in the inside of the micells, thereby fine particles (other particles) composed of an organic polymer only are undesirably by-produced. Accordingly, it is desirable that the using amount of the dispersion stabilizer is in the range of not less than the amount keeping the dispersion stability of the modified colloidal silica particles and not more than the concentration of forming micells in the medium (at the initiation of the polymerization).

The micell formation by the dispersion stabilizer is generally carried out in the concentration range of at least the critical micell concentration (CMC) but CMC differs according to the structure of the dispersion stabilizer and the environmental condition such as the salt concentration, etc. Even in the present invention, since the colloidal silica particles modified with the organoalkoxysilane exist in the medium, the dispersion stabilizer adsorbs onto the modified colloidal silica particles to lower the substantial concentration of the dispersion stabilizer in the medium, and thus, practical CMC is frequently increased as compared with the case of testing the dispersion stabilizer singly. It is difficult to definitely define CMC to various constitutions but in the present invention, the concentration of causing the level off of the lowering curve of the surface tension to the concentration of a dispersion stabilizer is defined as CMC and restraining the concentration of the dispersion stabilizer which is used in a medium directly before the polymerization below apparent CMC, the formation of the other particles can be avoided.

The dispersion stabilizer which is preferably used in the present invention is an anionic surface active agent and/or a high molecular dispersion stabilizer.

As the anionic surface active agent which can be used in the present invention, there are alkali metal salts of a higher fatty acid (soaps), such as sodium laurate, sodium stearate, sodium oleate, and the like; higher alcohol sulfuric acid ester sodium slats such as lauryl sulfuric acid ester sodium salt, cetyl sulfuric acid ester sodium salt, and the like; higher alkyl ether sulfuric acid ester salts such as lauryl alcohol ethylene oxide addition product sulfuric acid ester salt, and the like; sulfated oils; sulfated fatty acid esters; sulfated fatty acids; sulfated olefins; alkylbenzenesulfonic acid sodium salts such as sodium dodecylbenzenesulfonate, and the like; alkylaryl sulfonates; formalin-condensed naphthalene sulfonates; α-olefin sulfonates; alkyl(N-methyl)taurides such as oleyl(N-methyl)tauride, and the like; sulfosuccinic acid diester type surface active agents such as sulfosuccinic acid di-2-ethylhexyl ester sodium, and the like; higher alcohol phosphoric acid monoester disodium salts; higher alcohol phosphoric acid diester monosodium salts; phosphoric acid ester salts of a higher alcohol-ethylene oxide addition product; zinc dialkyldithiophosphate; and the like.

The anionic surface active agents which can be preferably used in the present invention are illustrated below:

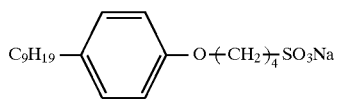

SA-1

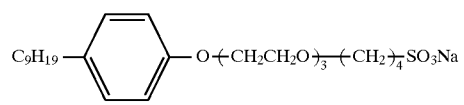

SA-2

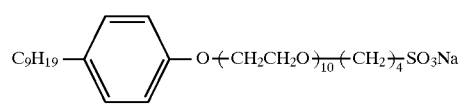

SA-3

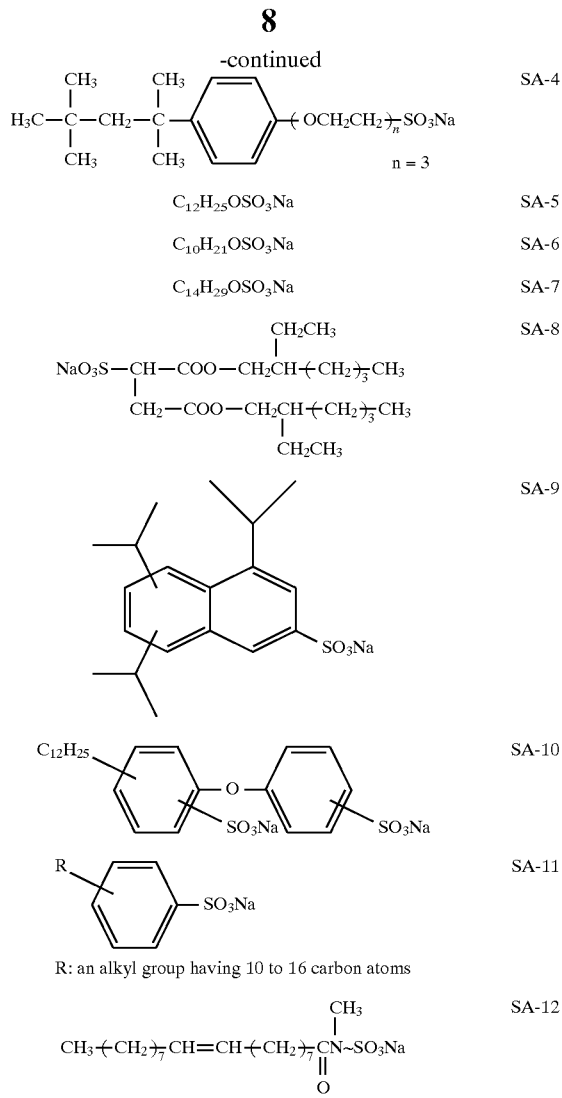

Also, in the present invention, a high molecular dispersion stabilizer can be used singly or together with the anionic surface active agent described above.

As the preferable high molecular dispersion stabilizer, there are proteins such as gelatin, colloidal albumin, casein, and the like; saccharide derivatives such as agar agar, sodium alginate, starch derivatives, and the like; cellulose compounds such as carboxymethyl cellulose, hydroxymethyl cellulose, and the like; polyvinyl alcohol; terminal long-chain alkyl group-modified polyvinyl alcohol; homopolymers or copolymers having as the constituting elements an ethylenically unsaturated monomer such as N-vinylpyrrolidone, acrylic acid, methacrylic acid, maleic acid, β-hydroxyethyl acrylate, β-hydroxyethyl methacrylate, vinyl alcohol, methyl vinyl ether, vinyl acetate, acrylamide, methacrylamide, diacetone acrylamide, vinylimidazole, and the like; synthetic hydrophilic polymers such as polyoxyethylene, polyoxypropylene, poly-2-methyloxazoline, and the like.

Also, as the high molecular dispersion stabilizer, the graft polymer or the block polymer, wherein the anchor group is separated from the dispersion stabilizing group, or a macromer (dispersion stabilizer precursor) may be used.

Among these high molecular dispersion stabilizers, the polypyrrolidone sole polymer, polyvinyl alcohol, polyacrylic acid, and polymethacrylic acid are particularly preferred.

The preferred molecular weight range of the high molecural dispersion stabilizer is from 2,000 to 500,000 (more preferably from 3,000 to 400,000) and the preferred concentration of the dispersion stabilizer is from 0.05 g/liter to 5 g/liter (more preferably from 0.08 g/liter to 3 g/liter).

Preferred examples of the vinyl monomer having at least one ethylenically unsaturated- group constituting the shell portion (organic polymer), which is used in the present invention include the esters or amides derived from acrylic acid or an α-alkylacrylic acid (e.g., methacrylic acid, and the like), such as N-i-propylacrylamide, N-n-butyl-acrylamide, N-t-butylacrylamide, N,N-dimethylacrylamide, N-methylmethacrylamide, acrylamide, 2-acrylamido-2-methyl-propanesulfonic acid, acrylamidopropyltrimethylammonium chloride, methacrylamide, acryloylmorpholine, N-methylolacrylamide, N-methylolmethacrylamide, methyl acrylate, ethyl acrylate, hydroxyethyl acrylate, n-propyl acrylate, i-propyl acrylate, 2-hydropropyl acrylate, 2-methyl-2-nitroporpyl acrylate, n-butyl acrylate, i-butyl acrylate, t-butyl acrylate, t-pentyl acrylate, 2-methoxyethyl acrylate, 2-ethoxyethyl acrylate, 2-methoxymethoxyethyl acrylate, 2,2,2-trifluoroethylethyl acrylate, 2,2-dimethylbutyl acrylate, 3-methoxybutyl acrylate, ethylcarbitol acrylate, phenoxyethyl acrylate, n-pentyl acrylate, 3-pentyl acrylate, octafluoropentyl acrylate, n-hexyl acrylate, cyclohexyl acrylate, cyclopentyl acrylate, cetyl acrylate, benzyl acrylate, n-octyl acrylate, 2-ethylhexyl acrylate, 4-methyl-2-propylpentyl acrylate, heptadecafluorodecyl acrylate, n-octadecyl acrylate, methyl methacrylate, 2,2,2-trifluoro-ethylethyl methacrylate, tetrafluoropropyl methacrylate, hexafluoropropyl methacrylate, hydroxyethyl methacrylate, 2-hydroxypropyl methacrylate, 2,3-dihydroxypropyl methacrylate, n-butyl methacrylate, i-butyl methacrylate, sec-butyl meth-acrylate, n-octyl- methacrylate, 2-methoxyethyl methacrylate, 2-ethoxyethyl methacrylate, benzyl methacrylate, heptadeca-fluorodecyl methacrylate, n-octadecyl methacrylate, 2-isobornyl methacrylate, 2-norbornylmethyl methacrylate, 5-norbonen-2-ylmethyl meth-acrylate, 3-methyl-2-norbonylmethyl methacrylate, dimethylaminoethyl methacrylate, and the like), acrylic acid or an α-alkylacrylic acid (acrylic acid, methacrylic acid, itaconic acid, and the like), vinyl esters (e.g., vinyl acetate), esters derived from maleic acid or fumaric acid (dimethyl maleate, dibutyl maleate, diethyl fumarate, and the like), sodium salts of maleic acid, fumaric acid, and p-styrenesulfonic acid, acrylonitrile, methacrylonitrile, dienes (e.g., butadiene, cyclopentadiene, and isoprene), aromatic vinyl compounds (e.g., styrene, p-chlorostyrene, t-butylstyrene, α-methylstyrene, and sodium styrenesulfonate), N-vinylpyrrolidone, N-vinyl-oxazolidone, N-vinylsuccinimide, N-vinylformamide, N-vinyl-N-methylformamide, N-vinylacetamide, N-vinyl-N-methylacetamide, 1-vinylimidazole, 4-vinylpyridine, vinylsulfonic acid, sodium vinylsulfonate, sodium allylsulfonate, sodium metasulfonate, vinylidene chloride, vinyl alkyl ethers (e.g., methyl vinyl ether), ethylene, propylene, 1-butene, isobutene, N-phenyl-maleimide, and the like.

These vinyl monomers may be used singly or as a combination thereof. As other vinyl monomers, those described in Research Disclosure, No. 1955 (July, 1980) can be also used. In the present invention, the acrylic acid esters or the methacrylic acid esters are preferably used as the vinyl monomers.

The vinyl monomer constituting the shell polymer may contain a polyfunctional vinyl monomer having 2 or more unsaturated groups other than the vinyl monomer described above.

Preferred examples of the polyfunctional vinyl monomer include divinylbenzene, 4,4'-isopropylidenediphenylene diacrylate, 1,3-butylene diacrylate, 1,3-butylene dimethacrylate, 1,4-cyclohexylenedimethylene dimethacrylate, diethylene glycol dimethacrylate, diisopropylidene glycol dimethacrylate, divinyloxymethane, ethylene glycol diacrylate, ethylene glycol dimethacrylate, ethylidene diacrylate, ethylidene dimethacrylate, allyl acrylate, allyl methacrylate, 1,6-diacrylamidohexane, N,N'-methylenebisacrylamide, N,N-(1,2-dihydroxy) ethylenebisacrylamide, 2,2-dimethyl-1,3-trimethylene dimethacrylate, phenylethylene dimethacrylate, tetraethylene glycol dimethacrylate, tetramethylene diacrylate, tetramethylene dimethacryate, 2,2,2-trichloroethylidene dimethacrylate, triethylene glycol diacrylate, pentaerythritol triacrylate, trimethylolpropane triacrylate, tetramethylolmethane tetraacrylate, triethylene glycol dimethacrylate, 1,3,5-triacryloylhexahydro-s-triazine, bisacrylamide acetate, ethylidine trimethacrylate, propyridine triacrylate, and vinylallyloxy acetate.

Among these polyfunctional vinyl monomers, divinylbenzene and ethylene glycol dimethacrylate are particularly preferred.

The polymerization which is used in the present invention can be preferably carried out by an emulsion polymerization in the radical polymerization methods of general high molecular synthetic methods.

About the general radical polymerization method, the production methods are described in detail in Takasi Ootsu and Masanobu Kinoshita, *Kobunshi Gousei no Jikken Hou* (*Experimental Method of High Molecular Synthesis*) (Kagaku Dojin), 1972 and Takayuki Ootsu, *Kouza Jyugou Hannou Ron* 1, *Radical Jyuqo* (*I*) (*Polymerizaion Reaction* 1, *Radical Polymerization* (*I*)), (Kagaku Dojin), 1971 and about the emulsion polymerization, the production methods are described in detail in Soichi Muroi, *Kobunshi Latex no Kagaku* (*Chemistry of High Molecular Latex*) (Kobunsi Kankoukai), 1970.

As the polymerization initiator which can be used for the polymerization in the present invention, there are inorganic persulfates such as potassium persulfate, ammonium persulfate, and the like; azonitrile compounds such as the sodium salt of azobiscyanovaleric acid, and the like; azoamidine compounds such as 2,2'-azobis(2-methylpropionamide) hydrochloride, and the like; cyclic azoamidine compounds such as 2,2'-azobis[2-(5-methyl-2-imidazolin-2-yl)propane hydrochloride, and the like; and azoamide compounds such as 2,2'-azobis{2-methyl-N-[1,1'-bis(hydroxymethyl)-2-hydro-xyethyl]propionamide, and the like.

Among these compounds, potassium persulfate and ammonium persulfate are preferred.

In the polymerization of the present invention, a chain-transfer agent can be used. As the preferable compounds which can be used as the chain-transfer agent, there are halogenated hydrocarbons such as carbon tetrachloride, carbon tetrabromide, ethyl acetate dibromide, ethyl acetate tribromide, ethylbenzene dibromide, ethane dibromide, ethane dichloride, and the like; mercaptans having SH group at the terminal of an alkyl group or an alkyl group modified various functional groups, such as tertiary dodecylmercaptan, n-dodecylmercaptan, hexadecylmercaptan (cetylmercaptan), n-octadecylmercaptan (stearylmercaptan), thioglycerol, and the like; disulfides such as diisopropylxanthogene disulfide, and the like; and thioglycol derivatives such as thioglycolic acid, thioglycolic acid-2-ethylhexyl, butyl thioglycolate, methoxybutyl thioglycolate, trimethylolpropanetris(thioglycolate), and the like.

In the case of using the chain-transfer agent, it is desirable that the using amount thereof is not more than 5% by weight to the amount of the vinyl monomer constituting the shell.

The composition ratio of (a) colloidal silica, (b) the organoalkoxysilane, and (c) the vinyl monomer having at least one ethylenically unsaturated group is preferably from 0.1 to 50 parts by weight of (b) and from 3 to 1,000 parts by weight of (c) to 100 parts by weight of (a), and more preferably from 0.1 to 30 parts by weight of (b) and from 5 to 800 parts by weight of (c) to 100 parts by weight of (a).

Also, the average particle size of the core/shell type composite particles of the present invention is preferably from 0.005 μm to 1 μm, and more preferably from 0.01 μm to 0.5 μm.

Then, preferred examples of the core/shell type composite particles having colloidal silica as the cores and having an organic polymer as the shells of the present invention are illustrated in Table 1(1) and Table 1(2) below but the present invention is not limited to them.

TABLE 1(1)

| No. | (1) | (2) | (3) | (4) | (5) | (6) | (7) |
|---|---|---|---|---|---|---|---|
| P-1 | (A) 100 | 121 | (SA-4) 1 | 2.5 | 100 | 50/50 | 179 |
| P-2 | (A) 100 | 121 | (SA-8) 1 | 2.5 | 100 | 50/50 | 181 |
| P-3 | (I) 100 | 15 | (SA-5) 5 | 10 | 100 | 50/50 | 35 |
| P-4 | (C) 100 | 50–80 | (SA-3) 3 | 5 | 800 | 11/89 | 175 |
| P-5 | (B) 100 | 40–60 | (SA-9) 0.5 | 40 | 750 | 12/88 | 133 |
| P-6 | (F) 100 | 328 | (SA-10) 2 | 1 | 25 | 80/20 | 385 |
| P-7 | (B) 100 | 40–60 | (SA-6) 3.5 | 7 | 300 | 25/75 | 103 |
| P-8 | (C) 100 | 50–80 | (SA-4) 7 | 6 | 50 | 67/33 | 91 |
| P-9 | (E) 100 | 210 | (SA-2) 0.8 | 3 | 30 | 77/23 | 255 |
| P-10 | (A) 100 | 121 | (SA-12) 5 | 2 | 700 | 13/87 | 283 |
| P-11 | (G) 100 | 147 | (SA-1) 1.5 | 30 | 200 | 33/67 | 271 |
| P-12 | (A) 100 | 121 | (SA-11) 2.5 | 3 | 650 | 13/87 | 286 |
| P-13 | (C) 100 | 50–80 | (SA-7) 1 | 2.5 | 100 | 50/50 | 101 |
| P-14 | (D) 100 | 10–20 | (SA-5) 6 | 10 | 200 | 33/67 | 31 |
| P-15 | (H) 100 | 270 | (SA-8) 3 | 7.5 | 20 | 83/17 | 322 |
| P-16 | (B) 100 | 40–60 | (SA-4) 1 | 4 | 5 | 95/5 | 57 |
| P-17 | (A) 100 | 121 | (SA-8) 4.5 | 1 | 550 | 15/85 | 279 |

In the above table:
(1): Colloidal silica, (wt. parts)
(2): Core particles diameter (nm)
(3): Dispersing agent (wt. parts)
(4): Monomer amount for silica/polymer bonding (wt. parts)
(5): Shell-constituting monomer amount (wt. parts)
(6): C/S ratio (wt.) ratio
(7): Particle diamter (nm)

TABLE 1(2)

| No. | Monomer for bonding silica/polymer | Shell-constituting monomer composition |
|---|---|---|
| P-1 | 3-Methacryloyloxypropyl-trimethoxysilane | n-Butyl acrylate/methacrylic acid = 98/30 |
| P-2 | 3-Methacryloyloxypropyl-trimethoxysilane | Styrene/2-ethylhexyl acrylate = 70/30 |
| P-3 | 3-Methacryloyloxypropyl-trimethoxysilane | 2-Ethylhexyl acrylate/methylmethacrylate/acrylic acid = 40/59/1 |
| P-4 | 3-Methacryloyloxypropyl-methyldimethoxysilane | Styrene |
| P-5 | Decylmethoxysilane | Methyl methacrylate |
| P-6 | Vinylethoxysilane | Vinyl acetate |
| P-7 | Methylvinyldiethoxysilane | Ethyl acrylate |
| P-8 | Dimethylvinyldimethoxysilane | n-Bityl acrylate |
| P-9 | 3-Methacryloyloxypropyl-methyldimethoxysilane | Styrene/2-ethylhexyl acrylate = 70/30 |
| P-10 | Vinylacetoxysilane | Methyl methacrylate/benzyl methacrylate = 50/50 |
| P-11 | 3-Methacryloyloxypropyl-methyldimethoxysilane | Styrene/α-methylstyrene = 80/20 |
| P-12 | Vinyltrimethoxysilane | Cyclohexyl acrylate |
| P-13 | Isobutyltriethoxysilane | Styrene/acrylonitrile = 80/20 |
| P-14 | γ-Aminopropyltriethoxysilane | n-Butyl methacrylate |
| P-15 | γ-glycidoxypropyltri-methoxysilane | Methyl acrylate/isopropyl acrylate = 40/60 |
| P-16 | γ-Chloropropyltrimethoxysilane | Sec-butyl methacrylate/ethylene glycol dimethacrylate = 90/10 |
| P-17 | Methylvinylmethoxysilane | Styrene/divinylbenzene = 85/15 |

Then, synthetic examples of the core/shell type composite particles having colloidal silica as the cores and having an organic polymer as the shells of the present invention are shown below.

SYNTHESIS EXAMPLE 1

Synthesis of P-1

In a glass-made 500 ml three-neck flask equipped with a stirrer, a thermometer, a reflux condenser were placed 301 ml of distilled water and 9.3 g of a 4.3% aqueous solution of a surface agent, SA-4 followed by stirring. After gradually adding 88.9 g of a 45% solution of colloidal silica (ST-ZL, trade name, made by Nissan Chemical Industries, Ltd., particle sizes 70 to 100 μm) to the above reaction liquid with stirring, pH of the reaction liquid was adjusted to 7.6 using 2N sulfuric acid. After raising the temperature of the reaction liquid to 80° C. in a nitrogen gas stream, 1.0 g of 3-methacryloyloxypropyl-trimethoxysilane was added to the reaction liquid and the mixture was stirred for 4 hours to complete the surface modification of the silica particles. Thereafter, a solution (initiator solution) formed by dissolving 0.128 g of potassium persulfate to 11 ml of distilled water was added and immediately thereafter, a liquid (monomer liquid) obtained by mixing 39.2 g of butyl acrylate and 0.8 g of methacrylic acid was added dropwise thereto using a constant-speed dropping apparatus over a period of 3 hours. At finishing the addition of the monomer liquid, the initiator solution was added again and further, the mixture was stirred, as it was, at 80° C. for 3 hours to complete the seed polymerization.

After cooling to room temperature, the reaction mixture was filtered to provide 446 g (yield 97%) of an aqueous dispersion of composite fine particles having 17.5% by

SYNTHESIS EXAMPLE 2

Synthesis of P-2

In a glass-made 500 ml three-neck flask equipped with a stirrer, a thermometer, and a reflux condenser were placed 300 ml of distilled water, 0.57 g of a 70% aqueous solution of a surface active agent, SA-8 followed by stirring. After gradually adding 87.7 g of a 45.6% solution of colloidal silica (ST-ZL, trade name, made by Nissan Chemical Industries, Ltd., particle sizes 70 to 100 µm) to the above reaction liquid with stirring, pH of the reaction liquid was adjusted to 7.5 using 2N sulfuric acid. After raising the temperature of the reaction liquid to 80° C. in a nitrogen gas stream, 1.0 g of 3-methacrolyloxypropylmethoxysilane was added thereto followed by stirring for 4 hours to complete the surface modification of the silica particles. Thereafter, a liquid (initiator solution) obtained by dissolving 0.128 g of potassium persulfate in 8 ml of distilled water was added and immediately thereafter, a liquid (monomer liquid) obtained by mixing 28 g of styrene and 12 g of 2-ethylhexyl acrylate was added dropwise thereto using a constant-speed dropping apparatus over a period of 3 hours. At finishing dropping of the monomer liquid, the same initiator solution was added again and the mixture was stirred, as it was, for 3 hours at 80° C. to complete the seed polymerization.

After cooling to room temperature, the reaction mixture was filtered to provide 440 g (yield 97%) of an aqueous dispersion of composite fine particles having 18.0% by weight of solid components, an average particle size of 181 nm, and a variation coefficient of 25%.

SYNTHESIS EXAMPLE 3

Synthesis of P-3

In a 300 ml four-neck flask equipped with a stirrer, a thermometer, and a reflux condenser were placed 5 g of SA-5, 33.3 g of colloidal silica (Snowtex 30 [solid component concentration 30%]), and 74 ml of ion-exchange water and pH of the reaction liquid was adjusted to 7.5 using 2N sulfuric acid followed by stirring. After raising the temperature of the reaction liquid to 60° C. in a nitrogen gas stream, 10 g of 3-methacryloyloxypropyltrimethoxysilane was added thereto and the mixture was stirred for 4 hours to complete the surface modification of the silica particles. Thereafter, to the above reaction liquid were added 0.5 g of ammonium persulfate and 0.2 g of sodium hydrogensulfite and further, a solution obtained by mixing 40 g of 2-ethylhexyl acrylate, 59 g of methyl methacrylate, and 1 g of acrylic acid was added dropwise to the mixture over a period of 3 hours. The reaction temperature during dropping the mixture was kept in the range of from 60° to 70° C. and after finishing the addition, the mixture was stirred for 2 hours while keeping the same temperature range. Thereafter, the reaction mixture was cooled, pH thereof was adjusted to from 8 to 9 and the reaction mixture was filtered to provide 504 g (yield 97%) having 40.5% by weight of solid components, an average particle size of 35 nm, and a variation coefficient of 26%. Other dispersions of composite fine particles of the present invention were also synthesized by the similar manners as above.

COMPARATIVE SYNTHESIS EXAMPLE 1

Synthesis of Q-1 [Organoalkoxysilane-free Composite Particles]

In a glass-made 500 ml three-neck flask equipped with a stirrer, a thermometer, and a reflux condenser were placed 312 ml of distilled water and 0.57 g of a 70% aqueous solution of a surface active agent, SA-8 followed by stirring. After gradually adding 87.7 g of 45.6% solution of colloidal silica (ST-ZL, trade name, made by Nissan Chemical Industries, Ltd.) to the above reaction solution with stirring, pH of the reaction liquid was adjusted to 7.5 using 2N sulfuric acid. After raising the temperature of the reaction liquid to 80° C. in a nitrogen gas stream, a solution (initiator solution) obtained by dissolving 0.128 g of potassium persulfate in 8 ml of distilled water was added and immediately thereafter, a liquid (monomer liquid) obtained by mixing 28 g of styrene and 12 g of 2-ethylhexyl acrylate was added dropwise thereto using a constant-speed dropping apparatus over a period of 3 hours. At finishing dropping of the monomer liquid, the same initiator solution was added again followed by stirring, as it was, for 3 hours at 80° C. to complete the seed polymerization.

After cooling to room temperature, the reaction mixture was filtered to provide 446 g (yield 98%) of a dispersion of fine particles having 17.5% by weight of solid components, an average particle size of 100 nm, and a variation coefficient of 21%.

COMPARATIVE SYNTHESIS EXAMPLE 2

Synthesis of Q-2 [The Case That Surface Active Agent Forms Micell]

In a glass-made 500 ml three-neck flask equipped with a stirrer, a thermometer, and a reflux condenser were placed 300 ml of distilled water and 3.43 g of a 70% aqueous solution of a surface active agent, SA-8 followed by stirring. After gradually adding 99 g of a 40.4% solution of colloidal silica (ST-ZL, made by Nissan Chemical Industries, Ltd.) to the above reaction liquid with stirring. pH of the reaction liquid was adjusted to 7.5 using 2N sulfuric acid.

After raising the temperature of the reaction liquid to 80° C. in a nitrogen gas stream, 1.0 g of 3-methacryloyloxypropyltrimethoxysilane was added thereto followed by stirring for 4 hours to complete the surface modification of the silica particles. Thereafter, a solution (initiator solution) obtained by dissolving 0.128 g of potassium persulfate in 8 ml of distilled water and immediately thereafter, a liquid (monomer liquid) obtained by mixing 28 g of styrene and 12 g of 2-ethylhexyl acrylate was added dropwise thereto using a constant-speed dropping apparatus over a period of 3 hours. At finishing dropping of the monomer liquid, the same initiator solution was added again and the mixture was stirred, as it was, for 3 hours at 80° C. to complete the seed polymerization.

After cooling to room temperature, the reaction mixture was filtered to provide 437 g (yield 97%) of a dispersion of composite fine particles having 18.1% by weight of solid components, an average particle size of 138 nm, and a variation coefficient of 24%.

COMPARATIVE SYNTHESIS EXAMPLE 3

Synthesis of Q-3 [The Compound Described in JP-B-4-48832]

In a 300 ml four-neck flask equipped with a stirrer, a thermometer, and a reflux condenser were placed 3 g of SA-5. 333 g of colloidal silica (Snowtex 30 [solid component concentration 30%]), and 74 ml of ion-exchange water followed by stirring. After raising the temperature of the reaction liquid to 60° C. in a nitrogen gas stream, 0.5 g of ammonium persulfate and 0.2 g of sodium hydrogensulfite were added to the above reaction liquid and further a solution obtained by mixing 40 g of 2-ethylhexyl acrylate, 59 g of methyl methacrylate, 1 g of acrylic acid, and 0.5 g of γ-methacryloyloxypropyltrimethoxysilane was added dropwise thereto over a period of 3 hours. The reaction temperature during dropping was kept in the range of from 60° to 70° C. and after finishing dropping, the mixture was stirred while keeping the same temperature range. Thereafter, the reaction mixture was cooled, pH thereof was adjusted to from 8 to 9 with 14% aqueous ammonia and filtered to provide 507 g (yield 99%) of a dispersion of composite fine particles having 38.7% by weight of solid components, an average particle size of 76 nm, and a variation coefficient of 27%.

COMPARATIVE SYNTHESIS EXAMPLE 4

Synthesis of Q-4 [Particles Composed of Shell Polymer Only]

In a glass-made 500 ml three-neck flask equipped with a stirrer, a thermometer, and a reflux condenser, were placed 300 ml of distilled water and 0.57 g of a 70% aqueous solution of a surface active agent, SA-8 followed by stirring. After adjusting pH of the reaction liquid to 7.5 using 2N sulfuric acid, the temperature thereof was raised to 80° C. in a nitrogen gas stream. Thereafter, a solution (initiator solution) obtained by dissolving 0.128 g of potassium persulfate in 8 ml of distilled water was added and immediately thereafter, a liquid (monomer liquid) obtained by mixing 28 g of styrene and 12 g of 2-ethylhexyl acrylate was added dropwise thereto using a constant-speed dropping apparatus over a period of 3 hours. At finishing dropping of the monomer liquid, the same initiator solution was added again followed by stirring as it was for 3 hours at 80° C. to complete the seed polymerization. After cooling to room temperature, the reaction mixture was filtered to provide 347 g (yield 93%) of a dispersion of fine particles having 10.9% by weight of solid components, an average particle size of 121 nm, and a variation coefficient of 15%.

EXAMPLE

Then, the examples of the present invention are described hereinbelow.

EXAMPLE 1

Characterization of Aqueous Dispersion of Fine Particles

About the compounds of the present invention, P-2 and P-3 (see, Table 1) and Comparative compounds Q-1, Q-2, and Q-3 (see, Table 2), the results analyzed by a transmission type electron microscope (TEM) and by X-ray electron photoelectron spectroscopy (XPS) are shown in Table 3 and FIG. 2 to FIG. 5 (Photographs 1 to 4) and FIG. 1, respectively.

TABLE 2(1)

| No. | (1) | (2) | (3) | (4) | (5) | (6) | (7) |
|---|---|---|---|---|---|---|---|
| Q-1 | (A) 100 | 124 | (SA-8) 1 | — | 100 | 50/50 | 100 |
| Q-2 | (A) 100 | 121 | (SA-4) 6 | 2.5 | 100 | 50/50 | 138 |

TABLE 2(1)-continued

| No. | (1) | (2) | (3) | (4) | (5) | (6) | (7) |
|---|---|---|---|---|---|---|---|
| Q-3 | (I) 100 | 15 | (SA-5) 3 | 0.5 | 100 | 50/50 | 76 |
| Q-4 | — | — | (SA-8) 1 | — | 100 | — | 121 |

In the above table:
(1) to (7) have the same meaning in Table 1(1) described above.

TABLE 2(2)

| No. | Monomer for bonding silica/polymer | Shell-constituting monomer composition |
|---|---|---|
| Q-1 | — | Styreme/2-ethylhexyl acrylate = 70/30 |
| Q-2 | 3-Methacryloyloxypropyl-trimethoxysilane | Styrene/2-ethylhexyl acrylate = 70/30 |
| Q-3 | 3-Methacrloyloxypropyl-trimethoxysilane | 2-Ethylhexyl acrylate/methyl methacrylate/acrylic acid = 40/59/1 |
| Q-4 | — | Styrene/2-ethylhexyl acrylate = 70/30 |

[Observation by Transmission Type Electron Microscope (TEM)]

Each sample was diluted 5 times with distilled water and a slight amount thereof was placed on a mesh (Cu 180 A) covered with a carbon film using a glass rod and dried. The form of the dried sample was observed by a transmission type electron microscope (TEM) [JEOL2000FX] (acceleration voltage: 100 kV).

[Calculation of Composite Particle Forming Ratio]

Using the photographs (15,000 magnifications) observed by the transmission type electron microscope, 100 or more photographs were observed per one sample and the ratio (%) of the number of particles wherein a polymer layer was observed on the surface of the colloidal silica fine particles to the whole particles observed was defined as the composite particle formed ratio.

[Measurement of Surface Tension]

Immediately before the polymerization, a definite amount of the polymerizing medium was placed in a beaker for surface tension and the surface tension was measured using a Kyowa CBVP system A3 type tensiometer (manufactured by Kyowa Kaimen Kagaku K.K.).

[Measurement by X-ray Photoelectron Spectroscopy (XPS)]

Each dispersion was lyophilized and powdered to provide each sample, each sample obtained was attached to an adhesive tape (polyester adhesive tape No. 31B, made by NITTO DENKO CORPORATION) affixed on a sample chip and measured using an X-ray photoelectron spectroscope, ESCA-750 (trade name, manufactured by SHIMADZU CORPORATION).

TABLE 3

| Sample | Surface tension (dyne/cm) | Measurement result (*) | Composite Particle formed ratio |
|---|---|---|---|
| P-1 | 41.5 | 186/188 | 99% |
| P-2 | 42.3 | 164/167 | 99% |
| Q-1 | 61.0 | 12/165 | 7% |
| Q-2 | 34.2 | 23/287 | 8% |

In the above table:
(*): Comppsite particle number/whole particle number
P-1 and P-2: Samples of this invention
Q-1 and Q-2: Comparative samples From the comparison of FIG. 2 (Photograph 1), FIG. 3 (Photograph 2, and FIG. 5 (Photograph 4) and from the results of Table 3, it can be seen that in the polymer particle sample (Q-1, Photograph 2) wherein the organoalkoxysilane treatment was not applied to the silica particles, the surfaces of the silica particles are not sufficiently coated with the polymer and the formation ratio of the composite particles is low. On the other hand, it can be seen that in the composite particles of the present invention (P-2, Photograph 4), polymer coating is uniformly carried out as compared with the comparative compound and aggregation and other particles are not formed.

Figure 2:
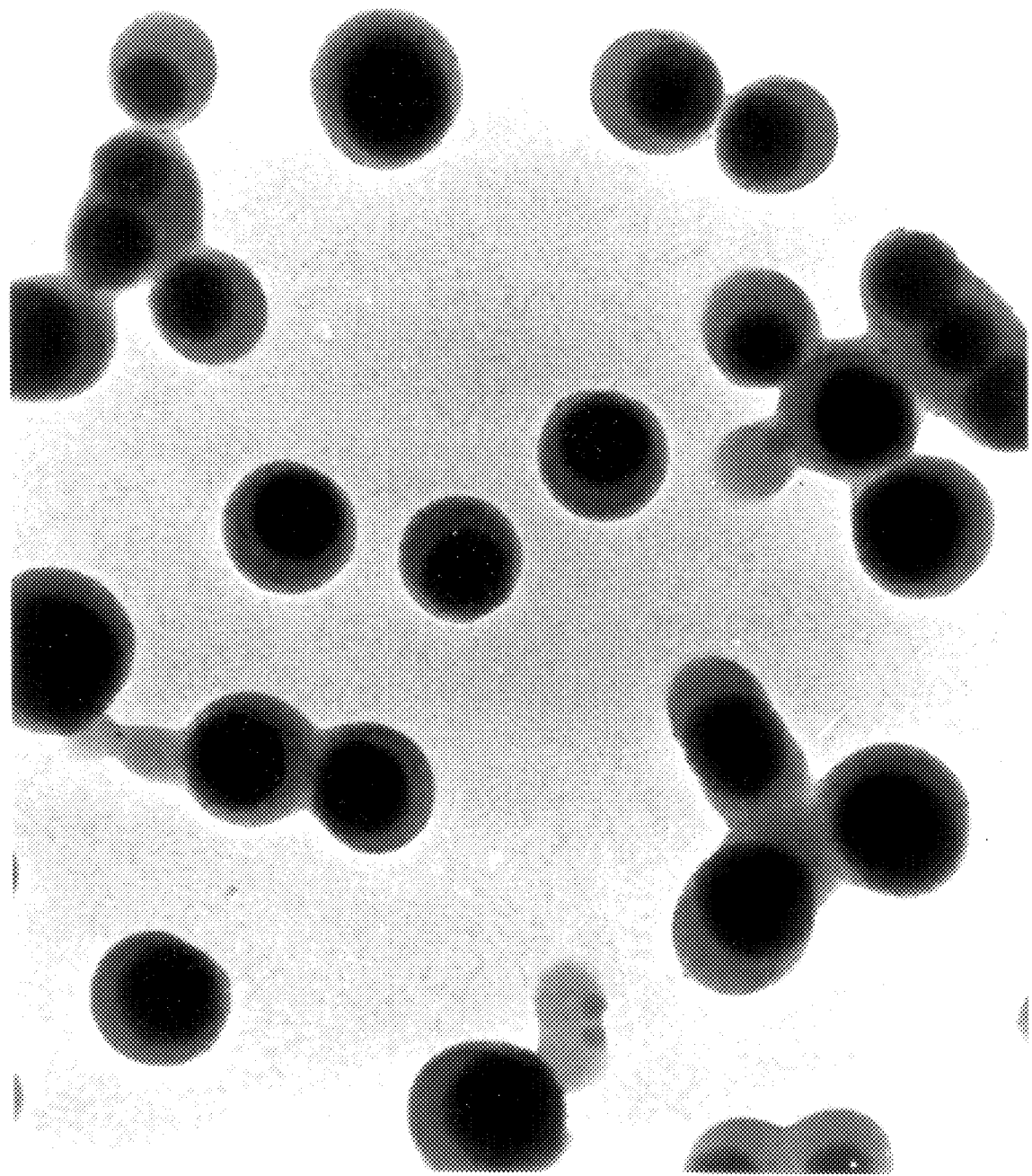
FIG. 2 is a scanning-type electron microphotograph obtained by observing the form of the aqueous dispersion of the composite fine particles (P-2) of the present invention by a transmission-type electron microscope.
Figure 3:
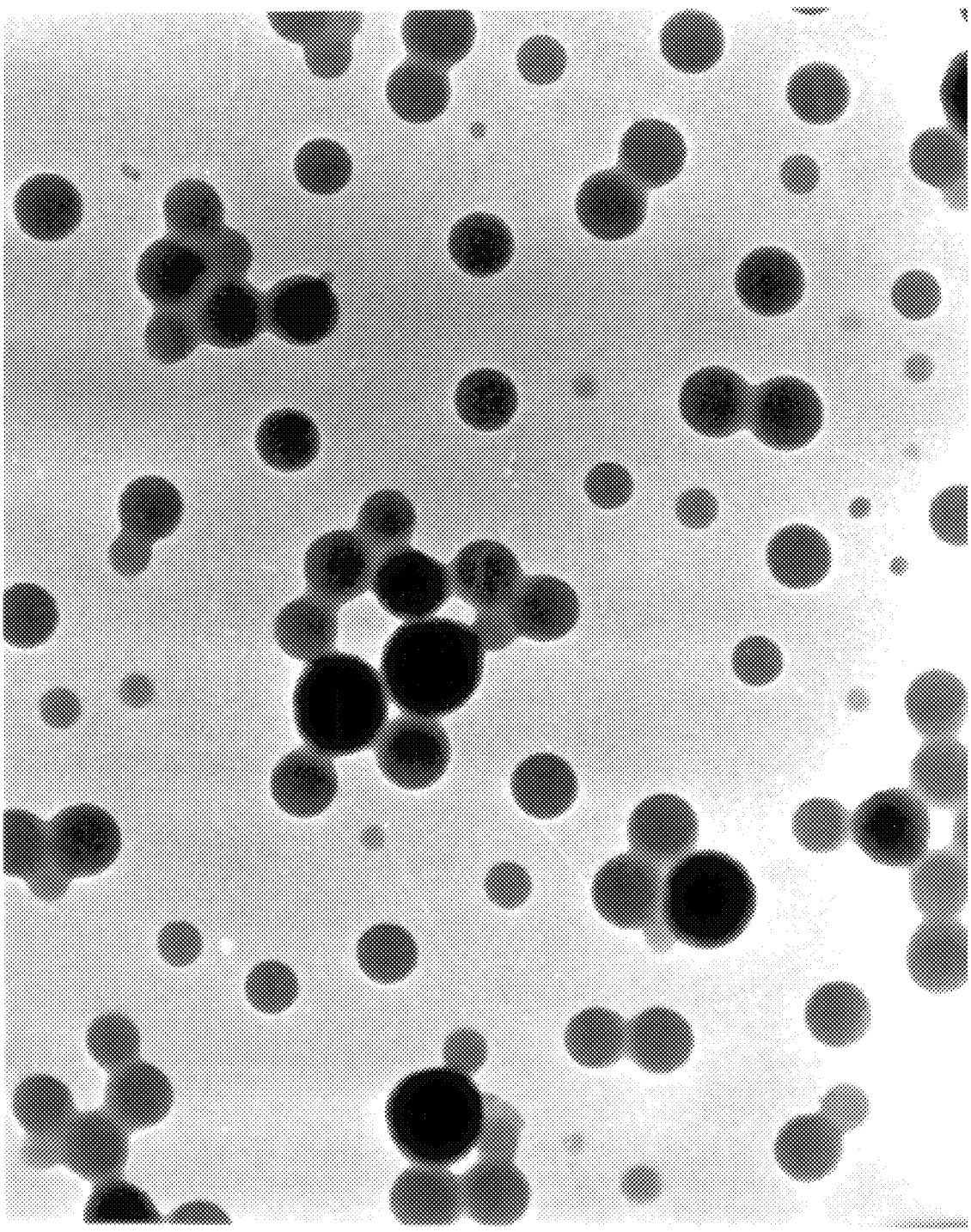
FIG. 3 is a scanning-type electron microphotograph obtained by observing the form of the comparative aqueous dispersion of the composite fine particles (Q-2) by a transmission-type electron microscope.
Figure 4:
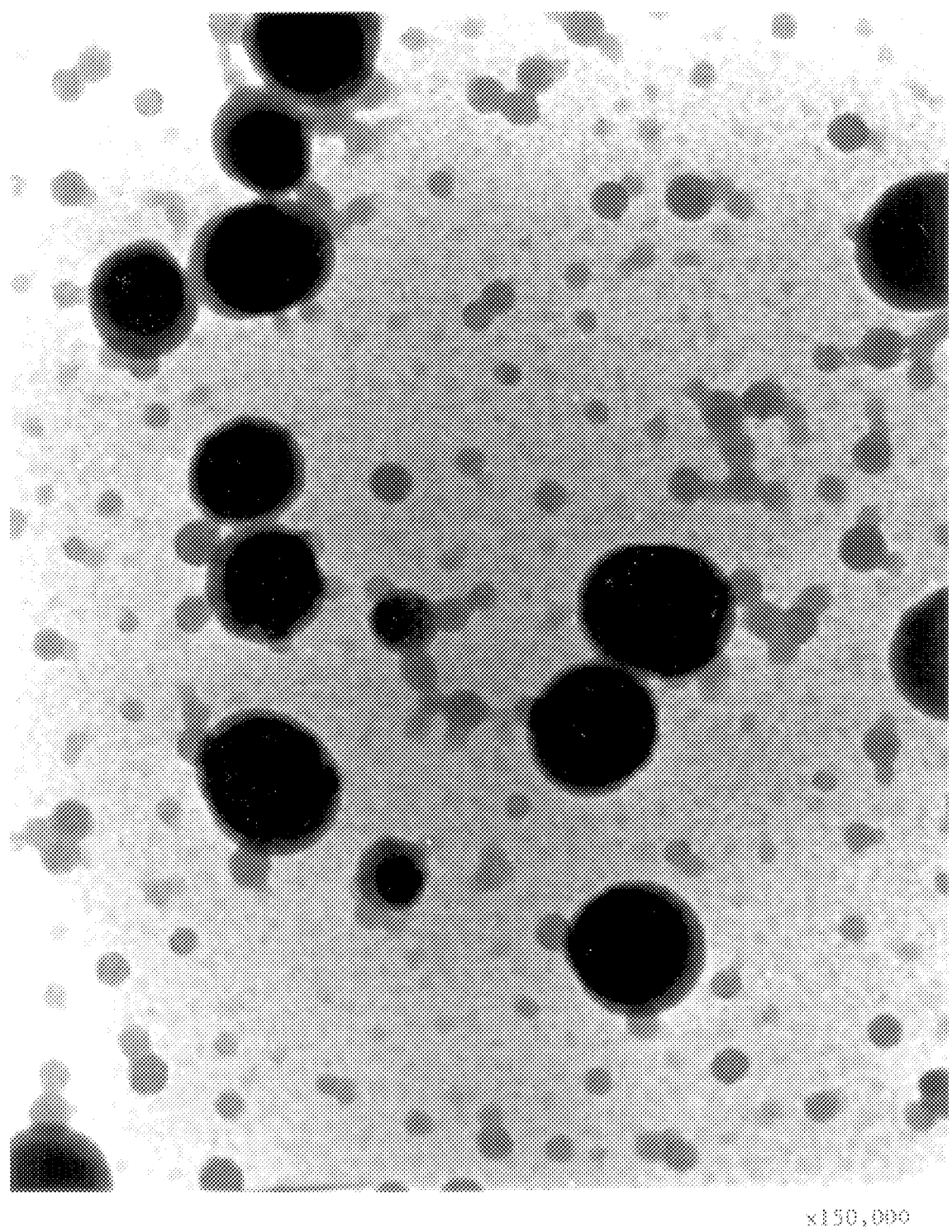
FIG. 4 is a scanning-type electron microphotograph obtained by observing the form of the comparative aqueous dispersion of the composite fine particles (Q-3) by a transmission-type electron microscope.
Figure 5:
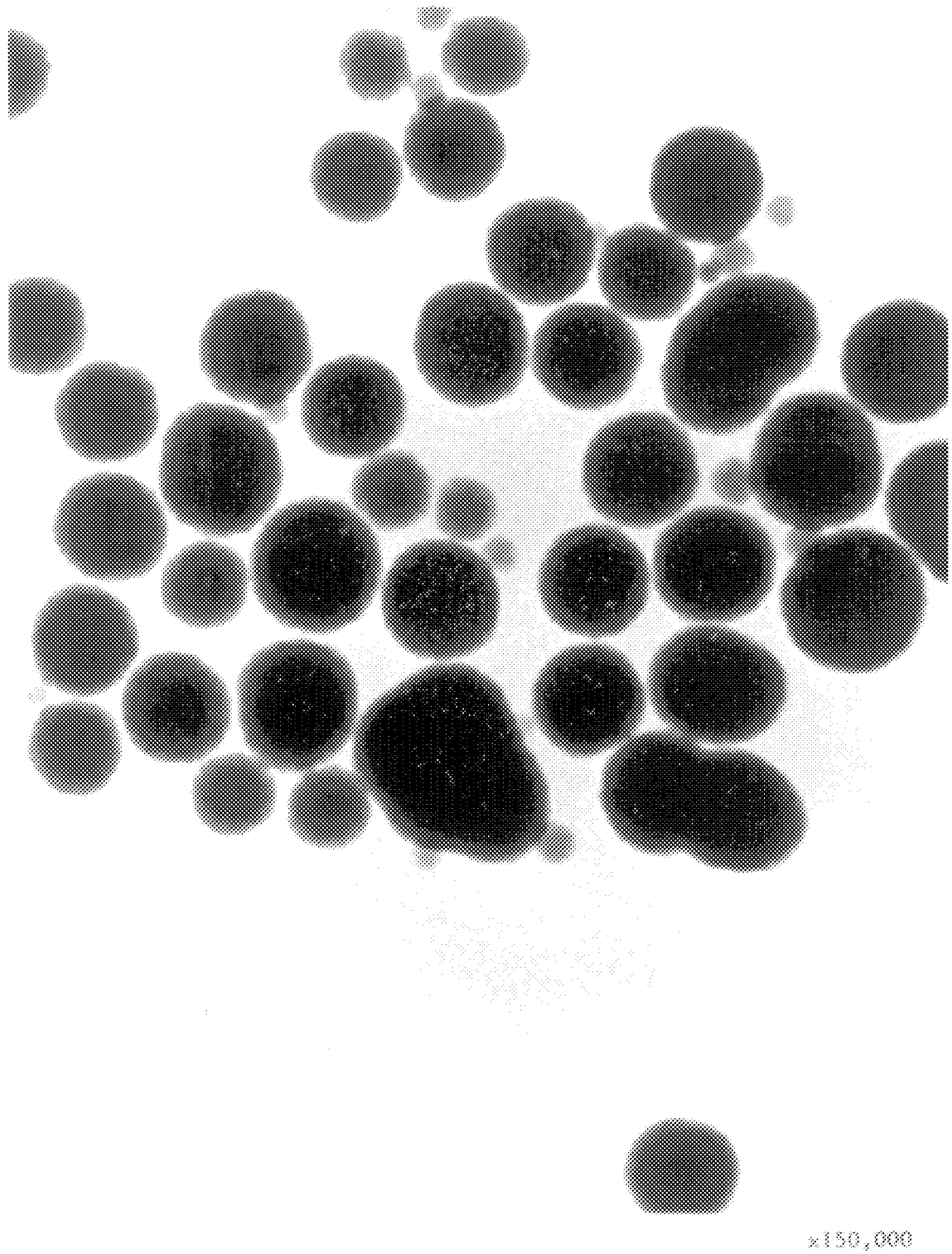
FIG. 5 is a scanning-type electron microphotograph obtained by observing the form of Snowtex-L (trade name, made by Nissan Chemical Industries, Ltd.) by a transmission-type electron microscope.

Also, from FIG. 2 (Photograph 1), FIG. 4 (Photograph 3), and FIG. 5 (Photograph 4) and from the results of Table 3, it can be seen that even when the organoalkoxysilane treatment is applied to the silica particles, when the surface active agent exists excessively (Q-2, Photograph 3; liquid concentration of the surface active agent: 0.06% by weight), many polymer sole particles -form to lower the composite particle formed ratio as compared with the case of the present invention (P-2 of the present invention, liquid concentration of the surface active agent: 0.01% by weight).

For example, when apparent CMC was determined from the surface tension data of a synthetic sample changing the concentration of the surface active agent including the sample of the present invention (P-2) and Comparative sample (Q-2), it was 0.045% by weight.

Furthermore, from FIG. 1 (XPS measurement result), in the sample of the present invention (P-3) which was seed polymerized by coupling before polymerizing the organoalkoxysilane, the peak originated in Si is only slightly observed and it can be seen that polymer coating proceeds smoothly. On the other hand, in the comparative sample (Q-3) polymerized by introducing the organoalkoxysilane together with the monomer at the polymerization in the form of copolymerizing, the peak originated in Si is clearly observed, which shows that a relatively large amount of the surfaces of the silica particles which are coated with the polymer exist.

EXAMPLE 2

One surface of a biaxially stretched polyethylene terephthalate support of 100 μm in thickness was coated with the following coating composition (coating solution pH of which was adjusted to 6 by adding 10% by wight of KOH) at a dry thickness of 9.0 μm and dried for 2 minutes at 180° C.

| Compound shown in Table 4 | 4.5 g (as solid component) |
|---|---|
| Gelatin | 10.5 g (as solid component) |
| Water to make | 200 g |

[Sample Evaluation]

1. Brittleness

After seasoning each sample for 1 hour or longer under the conditions of 20° C. and 10% RH, the mean value of the points that cracks first occurred was determined by the method same as ISO 6077 [Wedge brittleness test]. The large value shows that the sample is brittle and is liable to be cracked.

2. Measurement of Haze

The measurement of haze was carried out using a turbidimeter manufactured by Nippon Denshoku Kogyo K.K. The numerical values described in Table 2 were the values automatically measured as;

Haze=(scattered light/whole transmitted light)×100(%) and the value of the sample P-1 was defined as 100 and the values of other samples were shown by the relative values.

As the value of haze is less, the transparency of the film is preferably higher.

TABLE 4

| Sample | Brittleness (mm) | Haze |
|---|---|---|
| P-1 | 0 | 100 |
| P-2 | 2 | 101 |
| P-3 | 1 | 64 |
| P-4 | 6 | 98 |
| P-7 | 0 | 81 |
| P-8 | 0 | 76 |
| Q-1 | 15 | 112 |
| Q-2 | 12 | 105 |
| Q-3 | 18 | 107 |
| Q-4/colloidal silica A 5/5 (w/w) | 17 | 113 |

From the results of Table 4, it can be seen that the compounds of the present invention do not show brittleness even when they are filled in a gelatin film and further the transparency of the films is high. That is, it can be seen that the dispersibility of the composite particles of the present invention in a film is good.

EXAMPLE 3

Six samples of the silver halide photographic material were prepared in the same manner as in the examples of JP-A-1-177033, except that Compounds P-1 and P-2 each were added in amounts of 0.3 g/m², 1.0 g/m², 3.0 g/m² in place of the composite latexes comprising acrylic acid ester and colloidal silica in Samples 13, 14 and 15 of JP-A-1-177033, respectively.

The obtained six samples were processed in the same manner as in the examples of JP-A-1-177033 after exposure.

The processed samples were examined in the blackened scratches. As a result, the samples had almost no blackened scratches.

Therefore, it is seen that the sample of the present invention has an excellent anti-scratching property.

[Effect of the Invention]

By the production method of the aqueous dispersion of the present invention, it becomes possible to provide an aqueous dispersion of particles, which has good dispersion stability, does not by-produce polymer sole particles, and has a high coating extent of a polymer on the surfaces of silica particles.

Also, by using the aqueous dispersion produced by the production method of the aqueous dispersion of the present invention, it becomes possible to provide an excellent sealant and an excellent reinforcing agent for rubbers, a sedimentation inhibitor in the system containing fillers and pigments, a thickener for a liquid resins, and a thixotropic agent and a blocking inhibitor of films.

While the invention has been described in detail and with reference to specific embodiments thereof, it will be apparent to one skilled in the art that various changes and modifications can be made therein without departing from the spirit and scope thereof.

What is claimed is:

1. A film comprising a dried film coating of an aqueous dispersion of core/shell type composite particles having colloidal silica as the cores and having an organic polymer as the shells, comprising an aqueous dispersion of particles obtained by carrying out a reaction operation of coupling reacting (a) colloidal silica and
   (b) an organoalkoxysilane, in an aqueous medium in the presence of a dispersion stabilizer and, thereafter, polymerizing the coupling reaction product and (c) a vinyl monomer having at least one ethylenically unsaturated group, wherein at least 80% of the particles in the aqueous dispersion of the particles are core/shell type composite particles having colloidal silica as the cores and having an organic polymer as the shells, wherein said film is a silver halide photographic material.

2. The film as in claim 1, wherein the organoalkoxysilane contains a methacryloyl group.

3. The film as in claim 1, wherein the composition ratio of said (a) colloidal silica, (b) the organoalkoxysilane, and (c) the vinyl polymer having at least one ethylenically unsaturated group is from 0.1 to 50 parts by weight of (b) and from 3 to 1,000 parts by weight of (c) to 100 parts by weight of (a).

4. The film as in claim 1, wherein the vinyl monomer having at least one ethylenically unsaturated group of said (c) is a vinyl monomer selected from the group consisting of an acrylic acid ester, a methacrylic acid ester, and an aromatic vinyl compound.

5. The film as in claim 1, wherein the particle sizes of the core/shell type composite particles having colloidal silica as the cores and having an organic polymer as the shells are from 0.005 $\mu$m to 1 $\mu$m.

* * * * *